(12) United States Patent
Li

(10) Patent No.: US 10,996,799 B2
(45) Date of Patent: May 4, 2021

(54) TOUCH SCREEN ASSEMBLY AND ELECTRONIC DEVICE WITH IMPROVED LIGHT TRANSMITTANCE

(71) Applicant: Wuhan China Star Optoelectronics Semiconductor Display Technology Co., Ltd., Hubei (CN)

(72) Inventor: Wu Li, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 93 days.

(21) Appl. No.: 16/471,480

(22) PCT Filed: Mar. 14, 2019

(86) PCT No.: PCT/CN2019/078082
§ 371 (c)(1),
(2) Date: Jun. 19, 2019

(87) PCT Pub. No.: WO2020/124816
PCT Pub. Date: Jun. 25, 2020

(65) Prior Publication Data
US 2020/0409490 A1 Dec. 31, 2020

(30) Foreign Application Priority Data

Dec. 19, 2018 (CN) .......................... 201811556906.6

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
CPC .............. G06F 3/041–047; G06F 2203/04103
See application file for complete search history.

(56) References Cited

U.S. PATENT DOCUMENTS

| 2012/0057237 A1* | 3/2012 | Wako ................... G06F 3/0443 |
| | | 359/586 |
| 2014/0085551 A1* | 3/2014 | Koo ...................... G06F 3/0445 |
| | | 349/12 |
| 2015/0085448 A1 | 3/2015 | Hwang et al. |

(Continued)

FOREIGN PATENT DOCUMENTS

| CN | 103022230 A | 4/2013 |
| CN | 103022231 A | 4/2013 |

(Continued)

*Primary Examiner* — Laurence J Lee
(74) *Attorney, Agent, or Firm* — Hamre, Schumann, Mueller & Larson, P.C.

(57) ABSTRACT

A touch screen assembly and an electronic device are provided. The touch screen assembly comprises a first thin film layer, a conductive layer and a second thin film layer stacked together from bottom to top, and a base wherein the first film layer is disposed on the base. A difference value of refractive index between the base and the conductive layer is 0~0.6, thus improving light transmittance, reducing influence to visual effects and improving touch screen quality.

13 Claims, 4 Drawing Sheets

(56) References Cited

U.S. PATENT DOCUMENTS

| | | | | |
|---|---|---|---|---|
| 2015/0155418 A1* | 6/2015 | Hamada | ............... | H01L 31/109 136/265 |
| 2016/0253001 A1* | 9/2016 | Sugita | ............... | G06F 3/04166 345/174 |
| 2017/0274416 A1* | 9/2017 | Yeom | ................ | C23C 24/04 |
| 2020/0272281 A1* | 8/2020 | Zhang | ............... | G06F 3/04164 |

FOREIGN PATENT DOCUMENTS

| | | |
|---|---|---|
| CN | 103226212 A | 7/2013 |
| CN | 104658641 A | 5/2015 |
| CN | 105677071 A | 6/2016 |
| CN | 107422904 A | 12/2017 |

\* cited by examiner

TOUCH SCREEN ASSEMBLY AND ELECTRONIC DEVICE WITH IMPROVED LIGHT TRANSMITTANCE

FIELD OF INVENTION

The present invention relates to the field of display technology, and particularly to a touch screen assembly and electronic device.

BACKGROUND OF INVENTION

In recent years, the development of touch display technology has advanced by leaps and bounds, and users can directly operate on touch displays, so the display technology has received more and more attention and applications.

In the prior art, the transparent conductive oxide film is the main component of the capacitive touch screen. The film is located in the display area, and, generally it is formed by etching an ITO film. Visible light around an ITO electrode in the display area and in gaps of the ITO electrode which is reflected by the ITO electrode is quite different from the light penetrating through the ITO electrode regarding the spectrums thereof, so that the electrode and the gaps are clearly visible, and the colors thereof are not neutral. In addition, the larger size of the touch screen is, the smaller surface resistance of the ITO layer is required; therefore thickness of ITO layer is required to be thicker, resulting in more obvious color difference between the ITO electrode and the gaps therein. The visible light transmittance also is lowered, which seriously affects the visual effect and reduces the quality of the touch screen.

Therefore, the prior art has drawbacks and it needs urgent improvement.

SUMMARY OF INVENTION

Technical Problem

Embodiment of the present invention provides a touch screen assembly and an electronic device, which can improve the light transmittance, reduce influence to the visual effect and improve touch screen quality.

Technical Solution

In the first aspect, an embodiment of the present application provides a touch screen assembly, including: a first thin film layer, a conductive layer and a second thin film layer stacked together from bottom to top, and a base. The first film layer is disposed on the base, wherein a difference value of refractive index between the base and the conductive layer is 0~0.6.

In the touch screen assembly disclosed by the present invention, the base includes a substrate and doped materials in the substrate.

In the touch screen assembly disclosed by the present invention, the substrate includes a glass cover and a substrate glass.

In the touch screen assembly disclosed by the present invention, the doped materials include any one of niobium and lanthanum.

In the touch screen assembly disclosed by the present invention, a doping density of the doped materials is 0.05%~1%.

In the touch screen assembly disclosed by the present invention, a lead layer is further disposed on a periphery of the conductive layer.

In the touch screen assembly disclosed by the present invention, the conductive layer is composed of a plurality of crisscrossed conductive glass patches, and the conductive glass patches are obtained by etching treatment of the conductive layer.

In the touch screen assembly disclosed by the present invention, the etching treatment includes any one of yellow light etching and laser etching.

In the touch screen assembly disclosed by the present invention, the conductive layer is further provided with a functional layer on each of the upper and lower sides of the conductive layer, and the functional layer includes one or more of a mixture of silicon oxide and aluminum oxide, a mixture of silicon oxide and boron oxide, silicon oxide and a mixture of phosphorus oxides.

In the second aspect, an embodiment of the present application further provides an electronic device, including: a housing and a touch screen assembly. The touch screen assembly is disposed in the housing. The touch screen assembly includes a first thin film layer, a conductive layer and a second thin film layer stacked together from bottom to top, and a base. The first film layer is disposed on the base, wherein a difference value of refractive index between the base and the conductive layer is 0~0.6.

In the electronic device disclosed by the present invention, the base includes a substrate and doped materials in the substrate.

In the electronic device disclosed by the present invention, the substrate includes a glass cover and substrate glass.

In the electronic device disclosed by the present invention, the doped materials include any one of niobium and lanthanum.

In the electronic device disclosed by the present invention, a doping density of the doped materials is 0.05%~1%.

In the electronic device disclosed by the present invention, a lead layer is further disposed on a periphery of the conductive layer.

In the electronic device disclosed by the present invention, the conductive layer is composed of a plurality of crisscrossed conductive glass patches, and the conductive glass patches are obtained by etching treatment of the conductive layer.

In the electronic device disclosed by the present invention, the etching treatment includes any one of yellow light etching and laser etching.

In the electronic device disclosed by the present invention, the conductive layer is further provided with a functional layer on each of the upper and lower sides of the conductive layer, and the functional layer includes one or more of a mixture of silicon oxide and aluminum oxide, a mixture of silicon oxide and boron oxide, silicon oxide and a mixture of phosphorus oxides.

In the third aspect, an embodiment of the present application further provides a touch screen assembly, including: a first thin film layer, a conductive layer and a second thin film layer stacked together from bottom to top; and a base, the first film layer is disposed on the base; wherein a difference of value of refractive index between the base and the conductive layer is 0~0.6, wherein the first thin film layer and the second thin film layer are composed of silicon dioxide, and the conductive layer is composed of indium tin oxide.

Beneficial Effect

The embodiments of the present invention provide a touch screen assembly, including a first thin film layer, a conductive layer and a second thin film layer stacked together from bottom to top, and a base. The first film layer is disposed on the base, wherein a difference of value of refractive index between the base and the conductive layer is 0~0.6, thereby to improve light transmittance, reduce influence to visual effects and improve touch screen quality.

DESCRIPTION OF DRAWINGS

In order to more clearly to illustrate the technical solutions in the embodiments of present application, the technical solutions of the disclosure clearer and more apparent, the drawings to be used in the description of the embodiments will be briefly described below. Obviously, the drawings in the following description, it is merely an embodiment of the present invention, and those skilled in the art can obtain other drawings according to the provided drawings without any creative work.

DETAILED DESCRIPTION OF PREFERRED EMBODIMENTS

Figure 1:
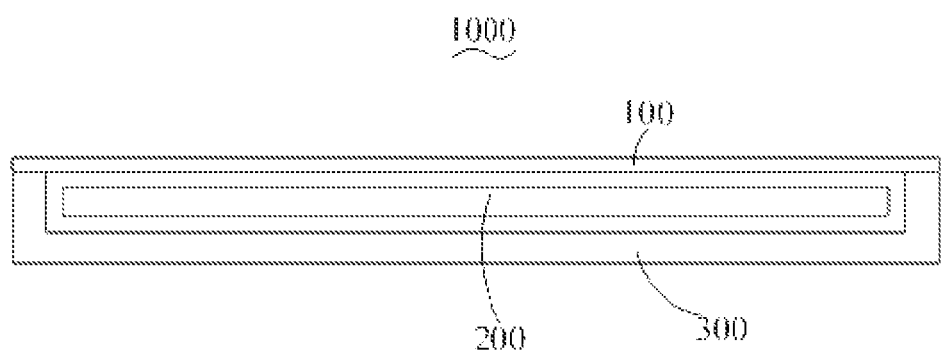
FIG. 1 is a schematic view of an electronic device provided by an embodiment of the present application.

The technical solutions in the embodiments of the present invention will be clearly and completely described in conjunction with the drawings in the embodiments of the present invention. It is obvious that the described embodiments are only a part of the embodiments of the present invention, and not all of the embodiments. Based on the embodiments of the present invention, all other embodiments obtained by those skilled in the art without creative efforts are within the scope of the present invention.

In the prior art, the transparent conductive oxide film is the main component of the capacitive touch screen of the capacitive touch screen, and it is located in the display area. Generally, the transparent conductive oxide film is formed by etching an ITO film. The refractive index of conductive film is difference from the refractive index of the touch screen substrate, the refractive index of ITO film is generally 1.9-2.0, the refractive index of the touch screen substrate is about 1.5. The difference of the refractive indexes causes visible light around an ITO electrode in the display area and in gaps of the ITO electrode which is reflected by the ITO electrode is quite different from the light penetrating through the ITO electrode regarding the spectrums thereof, so that the electrode and the gaps are clearly visible (the color difference $\Delta a^*$ and $\Delta b^*$ are larger than 1), and the colors thereof are not neutral (color values $|a^*|$ and $|b^*|$ are greater than 1). In addition, the larger the size of the touch screen is, the smaller surface resistance of the ITO layer is required. Therefore, thickness of ITO layer is required to be thicker, resulting in more obvious color difference between the ITO electrode and the gaps therein. The visible light transmittance also is lowered, which seriously affects the visual effect and reduces the quality of the touch screen.

A shadow elimination enhanced transparent conductive film is one of the main means to solve the color difference problem and improve the visible light transmittance. The shadow elimination transparent conductive film generally consists of a high and low refractive index transparent dielectric material and the ITO film on the outermost surface which are sequentially stacked, wherein the high refractive index material mainly includes antimony pentoxide (Nb2O5) or titanium dioxide (TiO2) film, ect, and the low refractive index material is generally a silicon dioxide (SiO2), a magnesium fluoride (MgF2) film, ect. For example, a patent document entitled "A glass for shadow elimination high-transmission OGS" (Publication No. CN103092416A) discloses a film system composed of a Nb2O5 layer, a SiO2 layer and an ITO layer, etc; a patent document entitled "A shadow elimination and enhanced conductive coating layer" (Publication No. CN102779570A) discloses a film system composed of a Nb2O5 or TiO2 layer, a SiO2 layer, and an ITO layer.

Although the shadow elimination film of Nb2O5 or TiO2 as a high refractive index layer has a high visible light transmittance, due to the higher refractive index in the visible range of Nb2O5 or TiO2, a slight change in the thickness of the Nb2O5 or TiO2 film layer causes a significant change in the optical thickness of the film, so that the visible light in the entire film system has obvious change, which further causes a change in color. That is, the thickness of the film layer, particularly the thickness of the high refractive index material, has an important influence on the change in the color of the film system. In order to obtain the shadowless glass with the shadow elimination effect, the coating control process of the high refractive index material is very demanding (for the thickness variation of Nb2O5 or TiO2 film layer is less than ±0.5 nm), whereby the process is difficult; in addition, the price of metal and ceramic targets of Nb and Ti materials is relatively high, and the manufacturing cost of the shadow elimination enhanced transparent conductive glass is also increased accordingly. Therefore, embodiments of the present invention provide the touch screen assembly and an electronic device, which can improve light transmittance, reduce influence to visual impact effects, and improve touch screen quality.

The embodiment of the present invention provides a touch screen assembly and an electronic device; the touch screen assembly can be integrated into an electronic device. The electronic device includes but not limited to a smart wearable device, a smart phone, a tablet computer, and a smart TV.

The embodiment of the present invention provides an electronic device, including: a first thin film layer, a conductive layer and a second thin film layer stacked together from bottom to top, and a base. The first film layer is disposed on the base, wherein a difference value of refractive index between the base and the conductive layer is 0~0.6.

The base includes a substrate and doped materials in the substrate.

The substrate includes a glass cover and substrate glass.

The doped materials include any one of niobium and lanthanum.

The doping density of the doped materials is 0.05%~1%.

The conductive layer is further provided with a lead layer disposed on a periphery of the conductive layer.

The conductive layer is composed of a plurality of crisscrossed conductive glass patches, and the conductive glass patches are obtained by etching treatment of the conductive layer.

The etching treatment includes any one of yellow light etching and laser etching.

The conductive layer is further provided with a functional layer on each of the upper and lower sides of the conductive layer, and the functional layer includes one or more of a mixture of silicon oxide and aluminum oxide, a mixture of silicon oxide and boron oxide, silicon oxide and a mixture of phosphorus oxides.

Please refer to FIG. 1. FIG. 1 is a schematic view of an electrical device 1000. The electrical device 1000 can include a touch assembly 100, a control circuit 200 and a housing 300. It should be noted that the electrical device 1000 shown in FIG. 1 is not limited to the above content, and may further include other devices, such as a camera, an antenna structure, a fingerprint unlocking module, ect.

The touch assembly 100 is disposed in the housing 300.

In some embodiments, the touch assembly 100 can be secured to the housing 300. The touch assembly 100 and the housing 300 form a confined space to accommodate components such as the control circuit 200.

In some embodiments, the housing 300 can be made of a flexible material, such as plastic housing or silicone housing, ect.

The control circuit 200 is mounted in the housing 300. The control circuit 200 can be a motherboard of the electrical device 1000. The control circuit 200 can integrate one, two or more of a battery, an antenna structure, a microphone, a speaker, a headphone interface, a universal serial bus interface, a camera, a distance sensor, an ambient light sensor, a receiver, and a processor.

The touch assembly 100 is mounted in the housing 300, and at the same time, the touch screen assembly 100 is electrically connected to the control circuit 200 to form a display surface of the electronic device 1000. The touch screen assembly 100 can include a display area and a non-display area. The display area can be used to display a screen of the electronic device 1000 or for a user to perform touch control, and so on. The non-display area can be used to set up various functional components.

Figure 2:
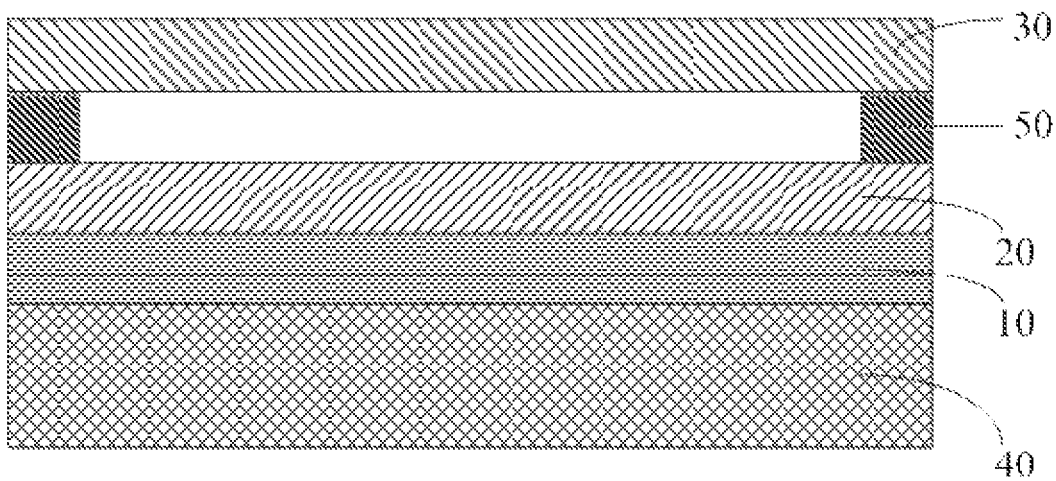
FIG. 2 is a schematic, cross-sectional view of a touch screen assembly provided by a first embodiment of the present application.
Figure 3:
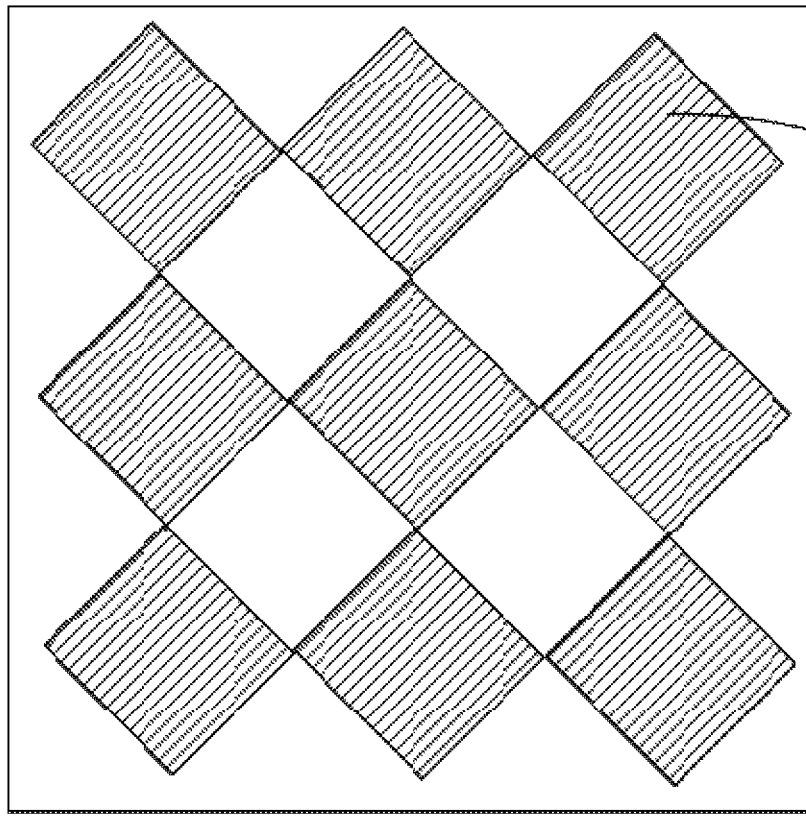
FIG. 3 is a top view of a conductive layer in the touch screen assembly provided by the first embodiment of the present invention.

Please refer to FIG. 2 and FIG. 3. FIG. 2 is a schematic, cross-sectional view of a touch screen assembly in accordance with a first embodiment of the present invention. FIG. 3 is a top view of a conductive layer in the touch screen assembly provided by the first embodiment of the present invention. The touch assembly 100 includes a first thin film layer 10, a conductive layer 20 and a second thin film layer 30 stacked together from bottom to top, and a base 40 wherein the first film layer 10 is disposed on the base 40. A difference of value of refractive index between the base 40 and the conductive layer 20 is 0~0.6.

In some embodiments, the conductive layer 20 is composed of a plurality of crisscrossed conductive glass patches 201, and the conductive glass patches 201 are obtained by etching treatment of the conductive layer 20.

It can be understood that the refractive index of the normal substrate is about 1.5, and the refractive index of the conductive layer 20 is about 2.1. However, the conductive layer 20 has a plurality of hollow regions, which causes the electrode of the conductive layer 20 to be seen when the user uses the electronic device 1000, whereby a visual contrast is produced. In order to eliminate such visual contrast, it is sufficient to ensure that a difference value of refractive index between the base 40 and the conductive layer 20 is 0~0.6. The hollow regions are defined in the place other than that the conductive glass patches 201 are formed.

In some embodiments, the first thin film layer 10 and the second thin film layer 30 are composed of silica ($SiO_2$), and the conductive layer 20 is composed of indium tin oxide (ITO).

The first thin film layer 10 and the second thin film layer 30 are provided for the purpose of electrical insulation to prevent the occurrence of the problem such as a short circuit inside the conductive layer 20.

The embodiment of the present invention provides a touch screen assembly 100, including a first thin film layer 10, a conductive layer 20 and a second thin film layer 30 stacked together from bottom to top, and a base 40, wherein the first film layer 10 is disposed on the base 40. A difference of value of refractive index between the base 40 and the conductive layer 20 is 0~0.6, thus improving the light transmittance, reducing influence to visual effect and improving touch screen quality.

In some embodiments, the base 40 includes a substrate and doped materials in the substrate.

In some embodiments, the substrate includes a glass cover 401 and substrate glass 402.

In some embodiments, the doped materials include any one of niobium and lanthanum.

It can be understood that the metal materials including any one of niobium and lanthanum are doped in the base 40 of the present invention to improve the reflectivity of the base 40.

In some embodiments, a doping density of the doped materials is 0.05%~1%.

It can improve the refractive index of the base 40 when the doping density meets 0.05%~1%, and the refractive index of conductive layer 20 approaching 2.1, so that the difference value of refractive index between the base 40 and the conductive layer 20 is 0~0.6.

In some embodiments, the etching treatment includes any one of yellow light etching and laser etching.

The yellow light etching is performed by applying a photosensitive substance (the photosensitive substance also referred to as a photoresist) coating on the surface of the conductive layer 20. The part of the coating left after exposure and development protects the bottom layer. Then the process of etching and stripping is performed. Finally, a permanent pattern is obtained. The laser etching is to focus laser light on labeled marks on the surface of the object to laser engraving the surface thereby to obtain the pattern. The lasered pattern in the object does not disappear by environmental factors such as abrasion. The lasered pattern can be permanently maintained.

Figure 4:
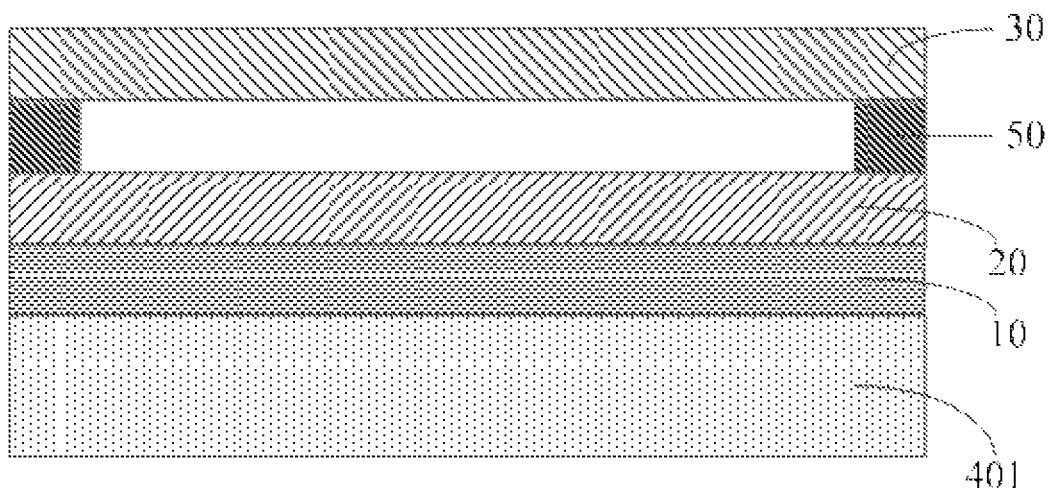
FIG. 4 is a schematic, cross-sectional view of a touch screen assembly provided by a second embodiment of the present invention.

In some embodiments, referring to FIG. 4, FIG. 4 is a schematic, cross-sectional view of a touch screen assembly provided by a second embodiment of the present invention. The base 40 is a first glass cover 401, and the first glass cover 401 is used to protect the touch display component (not shown in the figure) of the touch assembly 100. Thus, one glass solution structure (OGS) is formed. The OGS is simple, light, thin, and good in light transmittance. Since a glass cover plate and a bonding process are saved, the production cost is reduced and the product yield rate is improved.

Figure 5:
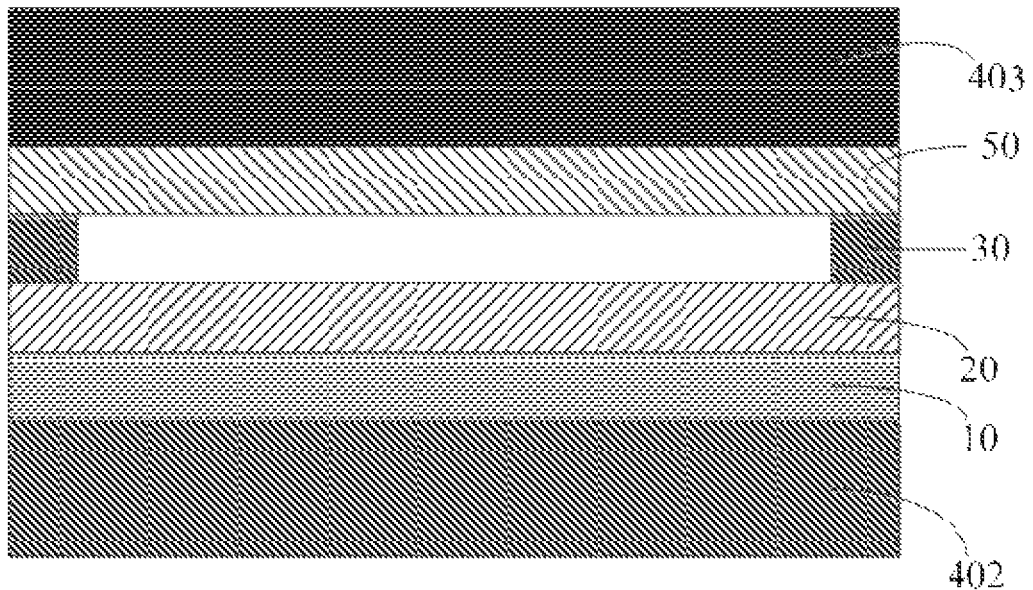
FIG. 5 is a schematic, cross-sectional view of a touch screen assembly provided by a third embodiment of the present invention.

In some embodiments, referring to FIG. 5, FIG. 5 is a schematic, cross-sectional view of a touch screen assembly provided by an embodiment of the present invention. The base 40 is a substrate glass 402.

In some embodiments, a second glass cover 403 is further disposed on the second film layer 30.

The substrate 40 is set as the substrate glass 402, and the difference between the substrate glass 402 and the first glass cover 401 is that the first glass cover 401 can protect the touch display component in the touch screen assembly 100, but the substrate glass 402 does not have a protective effect. The substrate glass 402 serves as a carrier to support the touch screen assembly 100, and the substrate glass 402 is used as a sensor glass to improve the touch sensitivity of the touch screen assembly 100.

The substrate glass 402, the first thin film layer 10, the conductive layer 20, the second thin film layer 30 and the glass cover 403 together form a structure of a cover plus another cover (glass+glass, G+G). The G+G structure has the characteristics of high hardness, wear resistance, long lifespan, high touch sensitivity and so on, and can improve the operating comfort of the electronic device 1000.

In some embodiments, the conductive layer 20 is further provided with a lead layer 50 on a periphery of the conductive layer 20.

The lead layer 50 is composed of a plurality of leads, and the plurality of leads are used to connect with an integrated circuit (IC) in a subsequent fabrication process.

Figure 6:
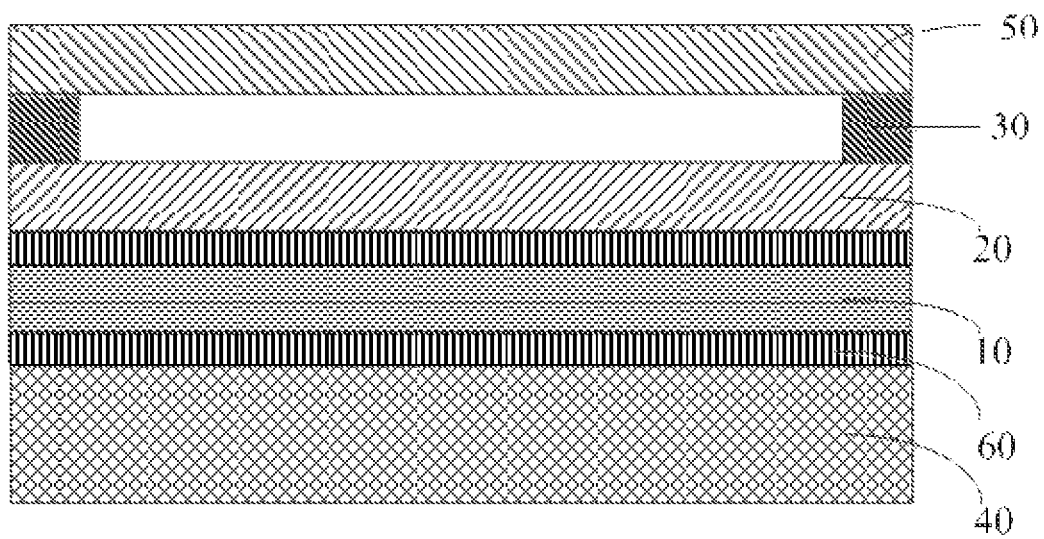
FIG. 6 is a schematic, cross-sectional view of a touch screen assembly provided by a fourth embodiment of the present invention.

Referring to FIG. 6, FIG. 6 is a schematic, cross-sectional view of a touch screen assembly provided by a fourth embodiment of the present invention. In some embodiments, the conductive layer 20 is further provided with a functional layer 60 on each of the upper and lower sides of the conductive layer 20, and the functional layer 60 includes one or more of a mixture of silicon oxide and aluminum oxide, a mixture of silicon oxide and boron oxide, silicon oxide and a mixture of phosphorus oxides.

In some embodiments, the vertical thickness of the first cover glass 401 is 0.4 to 1 millimeter (mm), the vertical thickness of the first film layer and the vertical thickness of the second film layer all are 100 nanometers (nm) to 5 micrometers (μm), the vertical thickness of the substrate glass is 0.2 to 1 mm, and the vertical thickness of the lead layer is 1 μm to 50 μm.

In some embodiments, the lead materials include but are not limited to, copper (Cu), silver (Ag), and silver paste.

Embodiments of the present invention provide a touch screen assembly 100, including: a first thin film layer 10, a conductive layer 20 and a second thin film layer 30 stacked together from bottom to top, and a base 40, wherein the first film layer 10 is disposed on the base. A difference of value of the refractive index between the base 40 and the conductive layer 20 is 0~0.6, thus improving the light transmittance, reducing influence to visual effect and improving touch screen quality.

Figure 7:
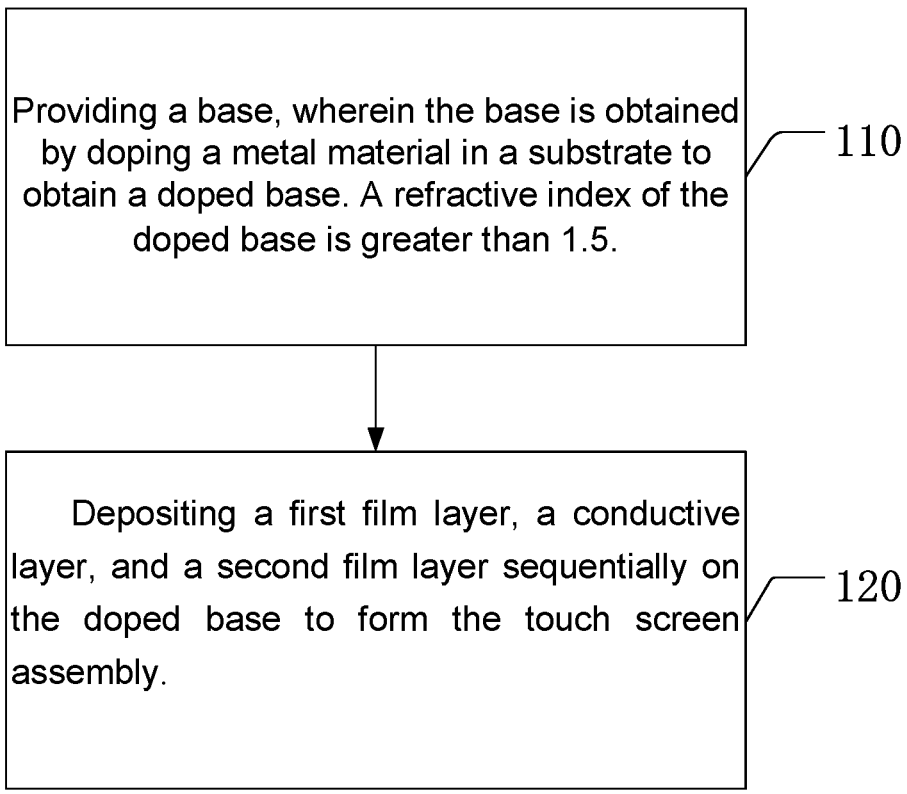
FIG. 7 is a flow chart of a method for manufacturing a touch screen assembly in accordance with an embodiment of the present invention.

An embodiment of the present invention further provides a manufacturing method of a touch screen assembly. Referring to FIG. 7, FIG. 7 is a flow chart of the method for manufacturing the touch screen assembly provided by the present invention. The manufacturing method of the touch screen assembly is used to manufacture the touch screen assembly as described above. The manufacturing method of the touch screen assembly includes:

110. Providing a base, wherein the base is obtained by doping a metal material in a substrate to obtain a doped base. A refractive index of the doped base is greater than 1.5. The base is used as a glass cover or a base glass.

120. Depositing a first film layer, a conductive layer, and a second film layer sequentially on the doped base to form the touch screen assembly.

The conductive layer is further provided with a lead layer thereon. The lead layer is obtained by etching treatment of the conductive layer.

The etching treatment includes any one of yellow light etching and laser etching.

An embodiment of the present invention further provides a touch screen assembly, including: a first thin film layer 10, a conductive layer 20 and a second thin film layer 30 stacked together from bottom to top, and a base 40 wherein the first film layer 10 is disposed on the base. A difference of value of the refractive index between the base 40 and the conductive layer 20 is 0~0.6, wherein the first thin film layer and the second thin film layer are composed of silicon dioxide, and the conductive layer is composed of indium tin oxide.

In the above embodiments, the description of each embodiment has its own emphasis, and the part that is not detailed in a certain embodiment can be referred to the related description of other embodiments.

Embodiments of the present invention provide the touch screen assembly and the electrical device which are described in detail above. The principle and implementation of the present invention are described by using specific examples. The description of above embodiments is only for helping to understand the technical solutions of the present invention and its core ideas; it will be understood for those skilled in the art that they can modify the technical solutions, or equivalently replace a part of technical feature; but these modifications or replacements do not depart from the scope of the technical solutions of the embodiments of the present invention as defined by the following claims.

What is claimed is:

1. A touch screen assembly, comprising:
a first thin film layer, a conductive layer, and a second thin film layer stacked together from bottom to top; and
a base wherein the first film layer is disposed on the base;
wherein a difference value of refractive index between the base and the conductive layer ranges from 0 to 0.6, the base comprising a substrate and doped materials in the substrate, the substrate is a glass cover or a substrate glass, and the doped materials comprise any one of niobium and lanthanum.

2. The touch screen assembly according to claim 1, wherein a doping density of the doped materials ranges from 0.05% to 1%.

3. The touch screen assembly according to claim 1, wherein a lead layer is further disposed on a periphery of the conductive layer.

4. The touch screen assembly according to claim 3, wherein the conductive layer is composed of a plurality of rows of conductive glass patches, and the conductive glass patches are obtained by etching treatment of the conductive layer.

5. The touch screen assembly according to claim 4, wherein the etching treatment comprises any one of yellow light etching and laser etching.

6. The touch screen assembly according to claim 1, wherein the conductive layer is further provided with a functional layer on each of the upper and lower sides of the conductive layer, and the functional layer comprises one or more of a mixture of silicon oxide and aluminum oxide, a mixture of silicon oxide and boron oxide, silicon oxide and a mixture of phosphorus oxides.

7. An electronic device including: a housing and a touch screen assembly, the touch screen assembly being disposed on the housing, the touch screen assembly comprising:

a first thin film layer, a conductive layer, and a second thin film layer stacked together from bottom to top; and a base wherein the first film layer is disposed on the base;

wherein a difference value of refractive index between the base and the conductive layer ranges from 0 to 0.6, the base comprising a substrate and doped materials in the substrate, the substrate is a glass cover or a substrate glass, and the doped materials comprise any one of niobium and lanthanum.

8. The electronic device according to claim 7, wherein a doping density of the doped materials ranges from 0.05% to 1%.

9. The electronic device according to claim 7, wherein a lead layer is further disposed on a periphery of the conductive layer.

10. The electronic device according to claim 9, wherein the conductive layer is composed of a plurality of rows of conductive glass patches, and the conductive glass patches are obtained by etching treatment of the conductive layer.

11. The electronic device according to claim 10, wherein the etching treatment comprises any one of yellow light etching and laser etching.

12. The electronic device according to claim 7, wherein the conductive layer is further provided with a functional layer on each of the upper and lower sides of the conductive layer, and the functional layer comprises one or more of a mixture of silicon oxide and aluminum oxide, a mixture of silicon oxide and boron oxide, silicon oxide and a mixture of phosphorus oxides.

13. A touch screen assembly, comprising:

a first thin film layer, a conductive layer, and a second thin film layer stacked together from bottom to top; and a base wherein the first film layer is disposed on the base;

wherein the base comprises a substrate and doped materials in the substrate, the substrate is a glass cover or a substrate glass, the doped materials comprise any one of niobium and lanthanum, a difference value of refractive index between the base and the conductive layer ranges from 0 to 0.6, the first thin film layer and the second thin film layer are composed of silicon dioxide, and the conductive layer is composed of indium tin oxide.

* * * * *